United States Patent
Schmitt et al.

(10) Patent No.: US 8,243,698 B2
(45) Date of Patent: Aug. 14, 2012

(54) DEVICE FOR CONVERTING UMTS SIGNALS TO ANOTHER SIGNAL STANDARD

(75) Inventors: Oliver Schmitt, Unterföhring (DE); Michael Fränkle, München (DE)

(73) Assignee: 02 (Germany) GmbH & Co. OHG, Munich (DE)

( * ) Notice: Subject to any disclaimer, the term of this patent is extended or adjusted under 35 U.S.C. 154(b) by 603 days.

(21) Appl. No.: 10/590,226

(22) PCT Filed: Feb. 22, 2005

(86) PCT No.: PCT/EP2005/001847
§ 371 (c)(1),
(2), (4) Date: Jul. 16, 2007

(87) PCT Pub. No.: WO2005/081549
PCT Pub. Date: Sep. 1, 2005

(65) Prior Publication Data
US 2007/0274269 A1    Nov. 29, 2007

(30) Foreign Application Priority Data
Feb. 23, 2004 (DE) .................. 10 2004 008 760

(51) Int. Cl.
*H04Q 7/24* (2006.01)
(52) U.S. Cl. .................. 370/338; 370/328; 455/41.2
(58) Field of Classification Search .................. 370/467, 370/244, 245, 328, 338; 455/41.1, 41.2, 455/230
See application file for complete search history.

(56) References Cited

U.S. PATENT DOCUMENTS

| | | | |
|---|---|---|---|
| 6,006,105 A * | 12/1999 | Rostoker et al. | 455/552.1 |
| 6,278,697 B1 * | 8/2001 | Brody et al. | 370/310 |
| 6,438,117 B1 * | 8/2002 | Grilli et al. | 370/331 |
| 6,950,655 B2 * | 9/2005 | Hunkeler | 455/426.1 |
| 6,956,846 B2 * | 10/2005 | Lewis et al. | 370/352 |

(Continued)

FOREIGN PATENT DOCUMENTS
DE    10143791    4/2003
(Continued)

OTHER PUBLICATIONS
Lustig, M. et al., "Planung von UMTS-Mobilfunknetzen mit dem Software-Tool Pegasos", *Unterrichtsblatter Jg.*, vol. 56, pp. 356-371, Jul. 2003, (partial translation).
Walke. B. et al. *UTMS—Ein Kurs*. Weil der Stadt., J. Schlembach Fachverlag, 2002. p. 128-132 (with English translation).

*Primary Examiner* — Cong Tran
(74) *Attorney, Agent, or Firm* — Alleman Hall McCoy Russell & Tuttle LLP

(57) ABSTRACT

The present invention relates to a device for converting UMTS-FDD signals into WLAN signals, comprising a receiver unit for receiving the UMTS-FDD signals, means for converting the signals received into WLAN signals as well as means for providing or transmitting the WLAN signals. The invention furthermore relates to a device for converting UMTS signals into signals according to a telephone standard, comprising a receiver unit for receiving the UMTS signals, means for converting the signals received into signals according to a telephone standard as well as means for providing or transmitting the signals according to a telephone standard. Finally, the invention relates to a communication system comprising a device as claimed in any of claims 1 to 9 as well as at least one computer connected with the device and/or at least one telephone system or fax machine.

14 Claims, 2 Drawing Sheets

U.S. PATENT DOCUMENTS

| | | | |
|---|---|---|---|
| 6,987,985 B2 * | 1/2006 | Purkayastha et al. | 455/552.1 |
| 7,050,800 B2 * | 5/2006 | Shaheen et al. | 455/426.2 |
| 7,251,227 B2 * | 7/2007 | de Jong et al. | 370/331 |
| 7,580,390 B2 * | 8/2009 | O'Shea | 370/331 |
| 2002/0037741 A1 * | 3/2002 | Tjalldin et al. | 455/552 |
| 2003/0035471 A1 * | 2/2003 | Pitsoulakis | 375/222 |
| 2003/0104809 A1 * | 6/2003 | Godshaw et al. | 455/426 |
| 2004/0076179 A1 * | 4/2004 | Kaminski et al. | 370/466 |
| 2004/0101125 A1 * | 5/2004 | Graf et al. | 379/229 |
| 2008/0280562 A1 * | 11/2008 | Zebic et al. | 455/41.2 |
| 2009/0116462 A1 * | 5/2009 | Powell et al. | 370/338 |

FOREIGN PATENT DOCUMENTS

| | | |
|---|---|---|
| DE | 101 52 855 | 5/2003 |
| EP | 1137240 | 9/2001 |
| EP | 1289200 | 3/2003 |
| WO | 2004/006447 | 1/2004 |
| WO | 2004/008698 A2 | 1/2004 |
| WO | 2004/012464 | 2/2004 |
| WO | WO2004/012374 | 2/2004 |

* cited by examiner

DEVICE FOR CONVERTING UMTS SIGNALS TO ANOTHER SIGNAL STANDARD

CROSS-REFERENCE TO RELATED APPLICATIONS

This is the U.S. national phase of International PCT Application Serial No. PCT/EP2005/001847 filed Feb. 22, 2005, which in turn claims priority to German Patent Application Serial No. 10 2004 008 760.1 filed Feb. 23, 2004, both of which applications are hereby incorporated by reference in their entirety for all purposes.

The present invention relates to a device for converting UMTS signals.

One of the problems of today's UMTS networks is the poor coverage with UMTS services in buildings (so-called deep indoor coverage). One of the possibilities for eliminating this problem would be to improve network coverage by a larger density of transmitting stations. However, the erection of additional transmission masts to improve UMTS network coverage involves considerable costs and therefore is disadvantageous. Another possibility would be the distribution of UMTS repeaters. These active network elements must, however, always remain under the absolute control of the network operator, as they would otherwise disturb network planning. Providing such devices to private users, and the flexible and mobile use thereof, therefore is not possible.

Accordingly, it is the object of the present invention to provide means for optimally utilizing UMTS services also in buildings in an inexpensive and flexible way.

This object is solved by a device with one or more of the features as described herein. The device in accordance with the invention effects the reception of UMTS-FDD services and the conversion of the two standard technologies UMTS-FDD and WLAN.

One conceivable application relates to private users of UMTS services, which by means of the device of the invention obtain a fast Internet access, even if not enough "indoor" UMTS coverage is available. In a preferred aspect of the invention, the device receives UMTS services on a suitable point, for instance on a window, and then provides WLAN coverage of the interior. Then, the user can for instance surf on the UMTS network by means of a WLAN notebook.

In accordance with a further aspect of the invention it is provided that communication is effected bidirectionally, i.e. WLAN signals are received by the device, are converted into UMTS-FDD signals, and the latter then are transmitted to the UMTS radio network.

Particularly advantageously, there are furthermore provided means for converting the UMTS-FDD signals received into signals according to a telephone standard, as well as means for providing or transmitting the signals according to a telephone standard. In this case as well, means are provided in accordance with a preferred aspect of the invention, which provide for a bidirectional communication, i.e. which convert the received signals according to a telephone standard into UMTS-FDD signals and then transmit the same.

The term "signals according to a telephone standard" includes any signals provided on a telephone connection. The telephone connection can for instance be a classical PSTN- or ISDN connection as it is used in Europe.

Accordingly, the device in accordance with the invention can be utilized for processing voice messages in the widest sense. It is conceivable that the device includes a receiver unit, by means of which voice messages based on the UMTS standard are received. Said voice messages are converted into signals of a telephone standard and are then provided on the device or transmitted by the same. Such aspect of the invention allows the complete replacement of a wireline telephone connection by the device of the invention. The term "voice messages" should cover a wide range and comprises for instance voice, telefax and the like.

The present invention furthermore relates to a device for converting UMTS signals into signals according to a telephone standard, comprising a receiver unit for receiving the signals according to the UMTS standard, means for converting the signals received into signals according to a telephone standard as well as means for providing or transmitting the signals according to a telephone standard. As described above, a wireline telephone connection can be replaced by the UMTS technology by means of such a device. Preferably, there are provided means which provide for a bidirectional communication, i.e. receive the signals according to a telephone standard, convert the same into UMTS signals and transmit the same into the network.

Such a device can be implemented with or without means for converting the UMTS services into WLAN data. Particularly advantageously, however, means are provided for converting the UMTS signals received into signals according to the WLAN standard as well as means for providing or transmitting the signals according to the WLAN standard. In such aspect of the invention the device not only provides for converting UMTS services into telephone connection data, but also into WLAN signals, and preferably also for receiving the WLAN signals, converting the same into UMTS signals and transmitting the UMTS signals into the UMTS network.

The means for providing the WLAN standard can comprise a slot as well as a plug-in WLAN card for outputting signals according to the WLAN standard.

In a further aspect of the invention it is provided that the means for providing the signals according to a telephone standard comprise a connection unit for a telephone system and/or a fax machine. The term telephone system should cover a wide range and can include one or more individual telephones or a telephone network with a plurality of interconnected telephones.

To provide for Internet usage by means of the device in accordance with the invention, it can be provided that the signals according to the UMTS-FDD standard or according to the UMTS standard comprise signals which provide for utilizing the Internet. In this way, Internet usage by means of the UMTS technology can be effected from a place at which there is not enough UMTS coverage.

It can furthermore be provided that the UMTS-FDD data or the UMTS data comprise voice data. These can for instance be voice messages or also fax messages. In this embodiment of the invention, the device is used for receiving or transmitting fax messages and for making telephone calls.

The present invention furthermore relates to a communication system comprising a device having one or more of the features noted herein in combination with at least one computer connected with the device and/or at least one telephone system or fax machine connected with the device.

What is conceivable is a communication system, in which it is made possible for users to surf in the Internet at home by means of WLAN and UMTS. In addition or as an alternative, the device can be used as a gateway for making telephone calls or for receiving or transmitting fax messages. The device provides considerable advantages as compared to the extension of a network. Another advantage results from the fact that known devices can be used, such as a WLAN laptop or a usual wireline telephone.

In a further aspect of the invention, the computers are connectable with the Internet as well as with each other. In one embodiment of the invention, working groups can be formed in this way. The members of the working group can communicate with each other via the access point formed by the device of the invention and together can build up an internal network. If necessary, a connection to the outside can be effected via UMTS.

The same is true for mobile hot spots for wireless areas such as construction sites, warehouses and the like. In such places, users can log in via WLAN without each user requiring a separate UMTS card and without each user requiring an excellent UMTS coverage.

If the communication system serves to transmit telephone and/or fax messages, it can be provided that the telephone system or the fax machine communicates with the device via a cord-connected line. It is thus conceivable that, as is common practice today with firmly installed wireline connections, the telephone system or the fax machine is connected with the device by means of a plug-in connection.

It is furthermore conceivable that the device communicates with a transceiver unit for telephone/fax data and that the transceiver unit has a cordless connection with the telephone system or the fax machine.

In a further aspect of the invention, the possibilities for connection of a telephone system or a fax machine are not different from those of commonly used firmly installed wireline sockets. The device of the invention provides a mobile wireline connection, which has considerable advantages as regards the administration effort (no log on, log off or change of registration) and as regards the mobility.

In the aforementioned embodiments, a bidirectional communication is possible in accordance with a preferred aspect of the invention.

Further details will be explained in detail with reference to an embodiment illustrated in the drawing, in which.

Figure 1:
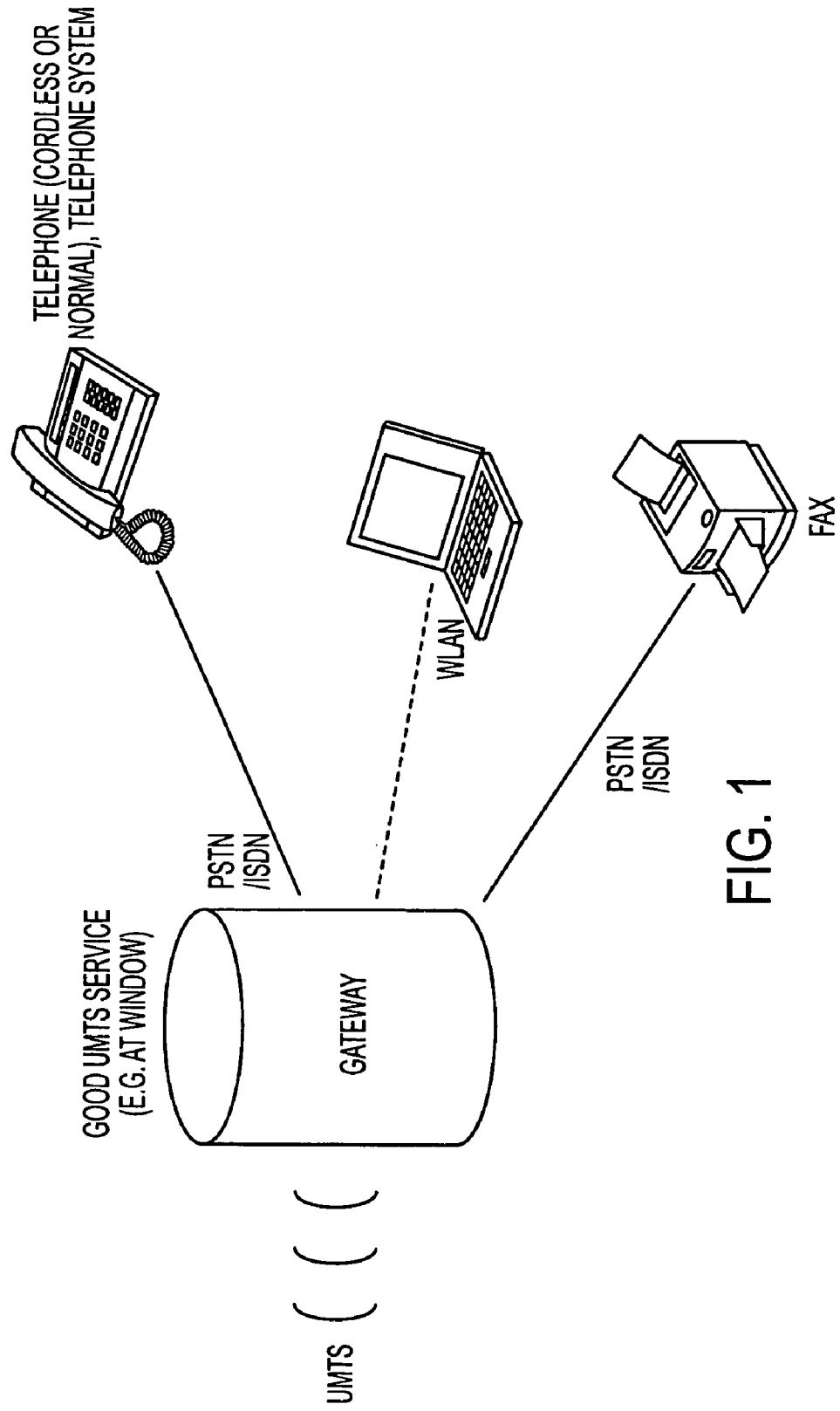
FIG. 1 is a schematic representation of the device in accordance with the invention for receiving and converting UMTS Internet data and UMTS voice/fax signals.

FIG. 1 shows an embodiment of the inventive device referred to as gateway, comprising a receiver unit for the wireless reception of UMTS-FDD data for utilizing the internet as well as for the reception of UMTS-FDD voice messages and fax data. The device furthermore includes means for converting the data received into signals according to the WLAN standard as well as the PSTN and/or ISDN standards. Furthermore, there are provided means for providing or transmitting the signals according to the WLAN as well as the PSTN and/or ISDN standards. On the one hand, this is a WLAN transceiver unit for receiving and transmitting the data from laptops suitable for WLAN. On the other hand, there is provided a socket for connection of a telephone or telephone system and of a fax machine.

As can be taken from FIG. 1, the device preferably is arranged in the vicinity of a good UMTS coverage, for instance on a window.

The illustrated device provides for a bidirectional communication, i.e. not only the reception of UMTS-FDD services, their conversion into WLAN signals or into PSTN and/or ISDN signals as well as the provision/transmission of these signals, but also the reception of WLAN, PSTN and/or ISDN signals, their conversion into UMTS-FDD signals as well as the transmission of the UMTS-FDD signals into the UMTS radio network.

The device of the invention in the embodiment as shown in FIG. 1 provides for the replacement of a firmly installed wireline socket and in addition provides for building up a WLAN network by using the UMTS technology even without UMTS coverage in the room itself.

The device is useful for private users and also for business purposes.

Figure 2:
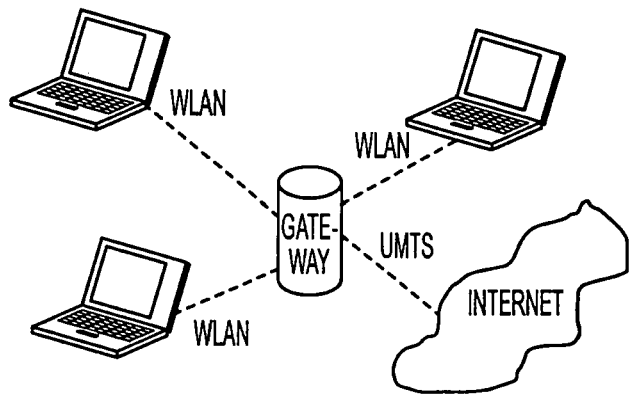
FIG. 2 is a schematic representation of a communication system in accordance with the invention comprising a plurality of computers interconnected via WLAN.

FIG. 2 shows a schematic representation of a communication system in accordance with the invention with a plurality of computers interconnected via WLAN. The members of the illustrated working group can communicate with each other via WLAN by means of the device in accordance with the invention. If necessary, the device can be used for connection to the Internet via UMTS-FDD. Accordingly, from each computer of the working group contact can either be made to another computer of the working group via the device or a log-in to the Internet can be effected. In this case, the device of the invention serves as a mobile access point, which in a preferred aspect provides for a bidirectional communication.

Figure 3:
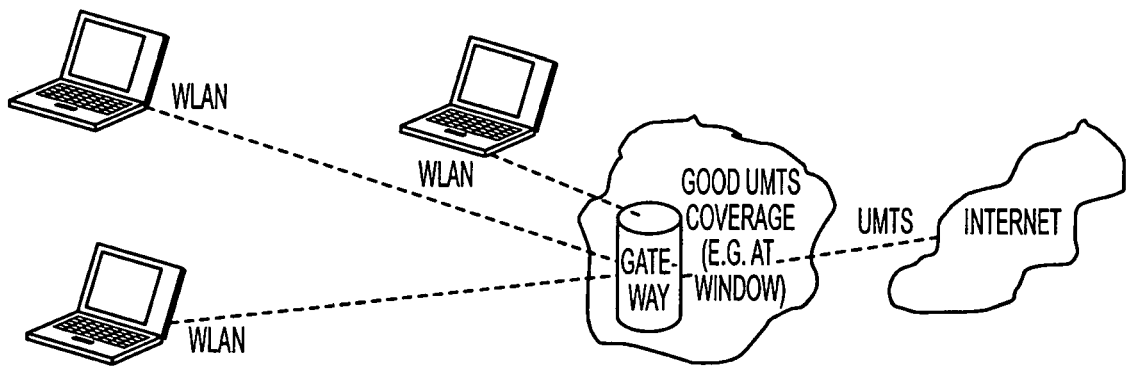
FIG. 3 is a schematic representation of a business hot spot in the form of the device in accordance with the invention.

FIG. 3 shows another application of the device in accordance with the invention as a mobile hot spot. If the device is installed in a wireless area, for instance in a factory hall, it is possible to log in there via WLAN by means of the device and via UMTS-FDD. It is not necessary that each computer has a UMTS card. It is not necessary either that each location of the computer has a sufficient UMTS coverage, as the computers do not communicate with the device via UMTS, but via WLAN, said device establishing a preferably unidirectional connection to the outside via UMTS-FDD.

The invention claimed is:

1. A device for converting Universal Mobile Telecommunication System-Frequency Division Duplexing (UMTS-FDD) signals into Wireless Local Area Network (WLAN) signals, comprising:
   a receiver unit for receiving the UMTS-FDD signals, wherein the device converts the UMTS-FDD signals received into the WLAN signals, and wherein the device further converts the UMTS-FDD signals received into signals according to a Public Switched Telephone Network (PSTN) standard and/or an Integrated Service Digital Network (ISDN) standard;
   means for providing or transmitting the WLAN signals; and
   means for providing or transmitting the signals according to the PSTN standard and/or the ISDN standard;
   wherein the device is installed at a point in a building where the UMTS-FDD signals cannot provide suitable UMTS-FDD signal coverage to an interior region of the building where there is no UMTS coverage, and wherein at said point the UMTS-FDD signals are received by the device, and from said point the device transmits the WLAN signals and the signals according to the PSTN standard and/or the ISDN standard to provide WLAN signal coverage and PSTN and/or ISDN signal coverage to a plurality of different user terminals in the interior region of the building coincidentally.

2. The device as claimed in claim 1, further comprising:
   means for converting the UMTS-FDD signals received into signals according to a telephone standard; and
   means for providing or transmitting the signals according to the telephone standard.

3. A device for converting Universal Mobile Telecommunication System (UMTS) signals into signals according to a Public Switched Telephone Network (PSTN) standard and/or an Integrated Service Digital Network (ISDN) standard, comprising:

a receiver unit for receiving the UMTS signals, wherein the device converts the UMTS signals received into the signals according to the PSTN standard and/or the ISDN standard; and means for providing or transmitting the signals according to the PSTN standard and/or the ISDN standard;

wherein the device is installed at a point in a building where the UMTS signals cannot provide suitable UMTS signal coverage to an interior region of the building where there is no UMTS coverage, and wherein at said point the UMTS signals are received by the device, and from said point the device transmits the signals according to the PSTN standard and/or the ISDN standard to provide PSTN and/or ISDN signal coverage to a plurality of different user terminals in the interior region of the building coincidentally.

4. The device as claimed in claim 3, wherein the device converts the UMTS signals received into Wireless Local Area Network (WLAN) signals, the device further comprising:

means for providing or transmitting the WLAN signals from said point to provide the interior region of the building with WLAN signal coverage.

5. The device as claimed in claim 4, wherein the means for providing or transmitting the WLAN signals comprises a slot and a plug-in WLAN card to be inserted into the same, by means of which signals according to the WLAN standard are generated.

6. The device as claimed in claim 3, wherein the means for providing or transmitting the signals according to the PSTN standard and/or the ISDN standard comprises a connecting unit for a telephone system or a fax machine.

7. The device as claimed in claim 1, wherein the UMTS-FDD signals comprise Internet data.

8. The device as claimed in claim 1, wherein the UMTS-FDD signals comprise voice data.

9. The device as claimed in claim 8, wherein the voice data comprises voice messages and fax messages.

10. A communication system comprising:

a device for converting Universal Mobile Telecommunication System (UMTS) signals into signals according to a Public Switched Telephone Network (PSTN) standard and/or an Integrated Service Digital Network (ISDN) standard, comprising:

a receiver unit for receiving the UNITS signals, wherein the device converts the UNITS signals received into the signals according to the PSTN standard and/or the ISDN standard; and means for providing or transmitting the signals according to the PSTN standard and/or the ISDN standard;

wherein the device is installed at a point in a building where the UMTS signals cannot provide suitable UMTS signal coverage to an interior region of the building where there is no UMTS coverage, and wherein at said point the UMTS signals are received by the device, and from said point the device transmits the signals according to the PSTN standard and/or the ISDN standard to provide PSTN and/or ISDN signal coverage to a plurality of different user terminals in the interior region of the building coincidentally; and at least one computer and/or telephone system and/or fax machine connected with the device.

11. The communication system as claimed in claim 10, wherein the at least one computer is connectable by means of the device both with each other and with the Internet.

12. The communication system as claimed in claim 10, wherein the at least one telephone system or fax machine communicates with the device via a cord-connected line.

13. The communication system as claimed in claim 10, wherein the device communicates with a transceiver unit for telephone or fax data and the transceiver unit has a cordless connection with the telephone system or the fax machine.

14. The device as claimed in claim 1, wherein the means for providing or transmitting the WLAN signals comprises a slot and a plug-in WLAN card to be inserted into the same, by means of which signals according to the WLAN standard are generated.

* * * * *